United States Patent
Rafique et al.

(10) Patent No.: US 10,749,727 B2
(45) Date of Patent: Aug. 18, 2020

(54) METHOD FOR PROTECTING A LINK IN AN OPTICAL NETWORK

(71) Applicant: Xieon Networks S.a.r.l., Senningerberg (LU)

(72) Inventors: Danish Rafique, München (DE); Stefano Calabro, München (DE)

(73) Assignee: Xieon Networks S.à. r.l., Luxembourg (LU)

(*) Notice: Subject to any disclaimer, the term of this patent is extended or adjusted under 35 U.S.C. 154(b) by 0 days.

(21) Appl. No.: 16/083,717

(22) PCT Filed: Mar. 22, 2017

(86) PCT No.: PCT/EP2017/056758
§ 371 (c)(1),
(2) Date: Sep. 10, 2018

(87) PCT Pub. No.: WO2017/162709
PCT Pub. Date: Sep. 28, 2017

(65) Prior Publication Data
US 2019/0081845 A1    Mar. 14, 2019

(30) Foreign Application Priority Data
Mar. 22, 2016 (EP) .................................. 16161645

(51) Int. Cl.
*H04L 27/34* (2006.01)
*H04B 10/032* (2013.01)
(Continued)

(52) U.S. Cl.
CPC ....... *H04L 27/3444* (2013.01); *H04B 10/032* (2013.01); *H04B 10/5161* (2013.01);
(Continued)

(58) Field of Classification Search
CPC .............. H04B 10/032; H04B 10/5161; H04B 10/541; H04B 10/548; H04L 27/3444;
(Continued)

(56) References Cited

U.S. PATENT DOCUMENTS 5,289,501 A * 2/1994 Seshadri ............... H03M 13/25
375/254
5,892,879 A * 4/1999 Oshima ............... H03M 13/256
348/726
(Continued)

FOREIGN PATENT DOCUMENTS

WO    2010/024619 A2    3/2010

OTHER PUBLICATIONS

Calderbank, A.R., "Multilevel Codes for Unequal Error Protection," IEEE Transactions on Information Theory, vol. 39(4):1234-1247 (1993).
(Continued)

*Primary Examiner* — James M Perez
(74) *Attorney, Agent, or Firm* — Nelson Mullins Riley & Scarborough LLP; Anthony A. Laurentano

(57) ABSTRACT

Enclosed herewith is a method for protecting a link in an optical network configured for transmitting digital data employing a predetermined modulation format which comprises a number of symbols in a constellation diagram. A binary address is associated with each symbol. The modulation format allows for a constellation distortion, according to which the relative positions of constellation points in the constellation diagram are varied in a predetermined way by a predetermined degree. The method the steps of: A) partitioning the traffic in two or more priority classes, B) mapping higher priority traffic to predefined bit positions within the binary symbol addresses, C) evaluating the quality of a predetermined protection link, D) determining a degree of
(Continued)

Figure 1:
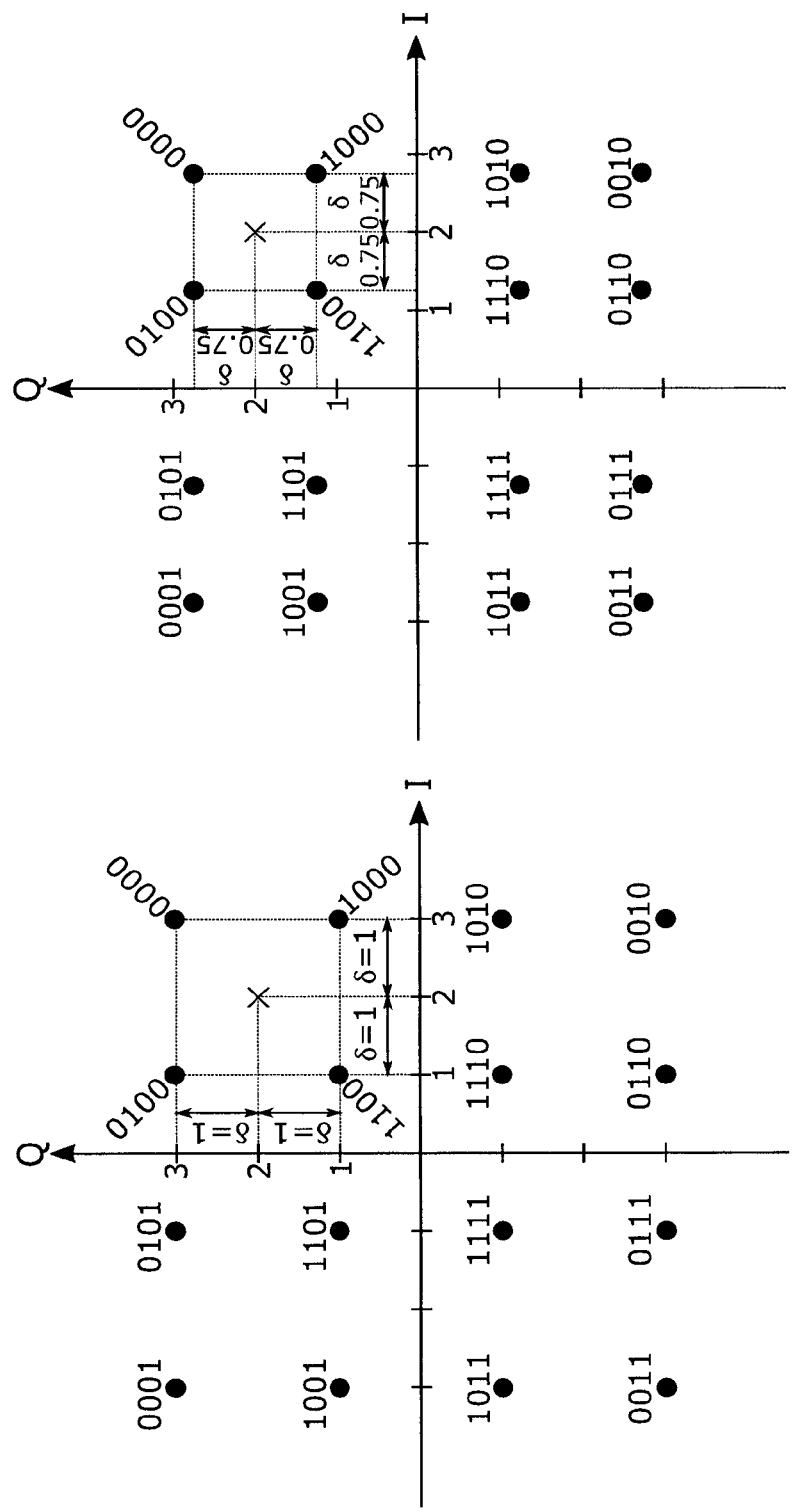

distortion such that a desired transmission quality for the transmission of the traffic of the highest priority class or classes via said predetermined protection link and a desired transmission quality for the full traffic via said given link are simultaneously ensured, and E) employing said distorted constellation diagram for transmission of digital data over said given link.

20 Claims, 7 Drawing Sheets

(51) Int. Cl.
  *H04J 14/02* (2006.01)
  *H04L 1/00* (2006.01)
  *H04L 27/36* (2006.01)
  *H04B 10/548* (2013.01)
  *H04B 10/54* (2013.01)
  *H04B 10/516* (2013.01)
(52) U.S. Cl.
  CPC ......... *H04B 10/541* (2013.01); *H04B 10/548* (2013.01); *H04L 1/007* (2013.01); *H04L 27/3405* (2013.01); *H04L 27/367* (2013.01)
(58) Field of Classification Search
  CPC ... H04L 1/007; H04L 27/3405; H04L 27/367; H04J 14/0287; H04J 14/0289; H04J 14/029; H04J 14/0291; H04J 14/0293–14/0297
  USPC .................................................. 375/259–352
  See application file for complete search history.

(56) References Cited

U.S. PATENT DOCUMENTS

| | | | | |
|---|---|---|---|---|
| 6,160,651 A * | 12/2000 | Chang | ................ | H04J 14/0227 370/352 |
| 6,259,744 B1 * | 7/2001 | Lee | ................ | H04L 1/0071 375/264 |
| 6,334,219 B1 * | 12/2001 | Hill | ................ | G06F 17/14 725/106 |
| 6,404,525 B1 * | 6/2002 | Shimomura | ................ | H04B 10/03 398/82 |
| 6,608,868 B1 * | 8/2003 | Murakami | ................ | H04L 27/206 375/261 |
| 6,674,768 B1 * | 1/2004 | Okamura | ................ | H04J 3/1682 370/329 |
| 6,889,356 B1 * | 5/2005 | Alamouti | ................ | H03M 13/235 5/265 |
| 6,934,317 B1 * | 8/2005 | Dent | ................ | H04L 1/0003 375/140 |
| 7,171,116 B2 * | 1/2007 | Korotky | ................ | H04B 10/505 398/16 |
| 7,173,551 B2 * | 2/2007 | Vrazel | ................ | G11C 27/02 341/144 |
| 7,210,092 B1 * | 4/2007 | Cameron | ................ | H03M 13/258 714/790 |
| 7,376,075 B1 * | 5/2008 | Petranovich | ................ | H04L 27/3494 370/205 |
| 7,643,801 B2 * | 1/2010 | Piirainen | ................ | H03F 1/0205 375/296 |
| 7,839,766 B1 * | 11/2010 | Gardner | ................ | H04J 14/0294 370/218 |
| 7,860,194 B2 * | 12/2010 | Kim | ................ | H04L 1/0052 375/262 |
| 7,864,883 B2 * | 1/2011 | Park | ................ | H04L 27/34 332/103 |
| 7,876,784 B1 * | 1/2011 | Lee | ................ | H04L 1/0048 370/203 |
| RE42,643 E * | 8/2011 | Oshima | ................ | G11B 20/00086 348/726 |
| 8,059,738 B2 * | 11/2011 | Kwon | ................ | H04L 27/2604 375/261 |
| 8,135,082 B2 * | 3/2012 | Choi | ................ | H04L 1/0041 375/264 |
| 8,238,488 B1 * | 8/2012 | Lee | ................ | H04L 25/03331 375/262 |
| 8,306,166 B1 * | 11/2012 | Fox | ................ | H04L 27/38 375/222 |
| 8,340,203 B2 * | 12/2012 | Kwon | ................ | H04L 27/2604 375/261 |
| 8,422,579 B1 * | 4/2013 | Morais | ................ | H04L 27/362 375/260 |
| 8,665,977 B2 * | 3/2014 | Cheng | ................ | H04L 27/34 375/261 |
| 8,675,751 B2 * | 3/2014 | Cannon | ................ | H04L 27/183 375/144 |
| 8,675,769 B1 * | 3/2014 | Eliaz | ................ | H04L 25/03178 375/295 |
| 8,867,482 B2 * | 10/2014 | Murakami | ................ | H04L 27/2627 370/330 |
| 9,294,329 B2 * | 3/2016 | Kohda | ................ | H04L 27/368 |
| 9,491,026 B2 * | 11/2016 | Murakami | ................ | H04L 27/34 |
| 9,571,322 B2 * | 2/2017 | Bae | ................ | H04L 27/2627 |
| 9,692,630 B2 * | 6/2017 | Qi | ................ | H03M 13/6306 |
| 9,853,846 B2 * | 12/2017 | Johansson | ................ | H04B 7/0639 |
| 10,148,465 B2 * | 12/2018 | Jia | ................ | H04L 25/03006 |
| 10,171,207 B2 * | 1/2019 | Ren | ................ | H04L 1/1607 |
| 10,177,948 B2 * | 1/2019 | Murakami | ................ | H04L 27/34 |
| 10,305,556 B2 * | 5/2019 | Murakami | ................ | H04B 7/0413 |
| 10,320,486 B1 * | 6/2019 | Kojima | ................ | H04L 27/36 |
| 2002/0109879 A1 * | 8/2002 | Wing So | ................ | H04J 7/00 398/58 |
| 2002/0141408 A1 * | 10/2002 | Chang | ................ | H04J 14/0227 370/390 |
| 2002/0167693 A1 * | 11/2002 | Vrazel | ................ | G11C 27/02 398/27 |
| 2003/0031233 A1 * | 2/2003 | Kim | ................ | H04L 1/0066 375/146 |
| 2003/0039322 A1 * | 2/2003 | Murakami | ................ | H04L 27/0008 375/329 |
| 2003/0081690 A1 * | 5/2003 | Kim | ................ | H04L 1/0003 375/264 |
| 2003/0215231 A1 * | 11/2003 | Weston-Dawkes | ................ | H04J 14/0284 398/19 |
| 2004/0068748 A1 * | 4/2004 | Currivan | ................ | H04B 1/71 725/111 |
| 2004/0261003 A1 * | 12/2004 | Shen | ................ | H03M 13/258 714/792 |
| 2005/0097617 A1 * | 5/2005 | Currivan | ................ | H04B 1/71 725/111 |
| 2005/0111590 A1 * | 5/2005 | Fang | ................ | H04L 27/205 375/330 |
| 2005/0185722 A1 * | 8/2005 | Abe | ................ | H04L 1/0003 375/259 |
| 2006/0114815 A1 * | 6/2006 | Hasegawa | ................ | H04B 1/707 370/208 |
| 2006/0171301 A1 * | 8/2006 | Casper | ................ | H04J 3/1617 370/225 |
| 2007/0286238 A1 * | 12/2007 | Wang | ................ | H04L 5/04 370/478 |
| 2008/0247470 A1 * | 10/2008 | Wang | ................ | H04L 1/0045 375/241 |
| 2009/0161786 A1 * | 6/2009 | Nakagawa | ................ | H03M 13/256 375/286 |
| 2009/0220019 A1 * | 9/2009 | Kwon | ................ | H04L 27/2604 375/261 |
| 2009/0296662 A1 * | 12/2009 | Laroia | ................ | H04L 1/1607 370/335 |
| 2010/0100789 A1 * | 4/2010 | Yu | ................ | H03M 13/114 714/752 |
| 2010/0157833 A1 * | 6/2010 | Vrcelj | ................ | H04L 27/2626 370/252 |
| 2010/0158512 A1 * | 6/2010 | Chang | ................ | H04J 14/0282 398/7 |

(56) References Cited

U.S. PATENT DOCUMENTS

| | | | | |
|---|---|---|---|---|
| 2010/0272195 | A1* | 10/2010 | Rao | H04L 27/2614 375/260 |
| 2011/0158257 | A1* | 6/2011 | Kwon | H04L 1/0086 370/474 |
| 2013/0045015 | A1* | 2/2013 | Kuschnerov | H04B 10/61 398/208 |
| 2013/0127558 | A1* | 5/2013 | Clevorn | H04L 27/3411 332/183 |
| 2013/0215942 | A1* | 8/2013 | Addepalli | H04L 27/345 375/224 |
| 2014/0093005 | A1* | 4/2014 | Xia | H04B 7/0617 375/267 |
| 2015/0010103 | A1* | 1/2015 | Murakami | H04L 1/08 375/267 |
| 2015/0236818 | A1* | 8/2015 | Qi | H03M 13/6306 375/341 |
| 2015/0280861 | A1* | 10/2015 | Qi | H04L 1/0042 714/776 |
| 2015/0288553 | A1* | 10/2015 | Qi | H03M 13/6306 375/340 |
| 2015/0349802 | A1* | 12/2015 | Shinohara | H03M 13/1165 714/752 |
| 2016/0156498 | A1* | 6/2016 | Loghin | H04L 27/36 375/298 |
| 2017/0134120 | A1* | 5/2017 | Calabro | H04B 10/548 |
| 2017/0222753 | A1* | 8/2017 | Angelopoulos | H04L 1/0043 |
| 2017/0257153 | A1* | 9/2017 | Xia | H04B 7/0617 |
| 2019/0053238 | A1* | 2/2019 | Zeng | H04L 1/0009 |
| 2019/0158211 | A1* | 5/2019 | Furst | H04B 10/40 |

OTHER PUBLICATIONS

International Search Report and Written Opinion, PCT/EP2017/056758, dated May 9, 2017, 16 pages.

Isaka, M. et al., "Multilevel Coded Modulation for Unequal Error Protection and Multistage Decoding—Part II: Asymmetrie Constellations," IEEE Transactions on Communications, vol. 48 (5):774-786 (2000).

Morelos-Zaragoza, R. et al., "Multilevel Coded Modulation for Unequal Error Protection and Multistage Decoding—Part I: Symmetric Constellations," IEEE Transactions of Communications, vol. 48(2):204-213 (2000).

Shen, C. et al., "On the Design of Modern Multilevel Coded Modulation for Unequal Error Protection," IEEE, 1355-1340 (2008) 978-1-4244-2075-9/08.

* cited by examiner

METHOD FOR PROTECTING A LINK IN AN OPTICAL NETWORK

RELATED APPLICATIONS

This application is a 35 U.S.C. 371 national stage filing of International Application No. PCT/EP2017/056758, filed on Mar. 22, 2017, which claims priority to European Patent Application No. 16161645.3, Mar. 22, 2016. The entire contents of these applications are incorporated herein by reference in their entirety.

FIELD OF THE INVENTION

The present invention is in the field of communication technology. In particular, the present invention relates to a fast protection technique realized in the optical transport layer of a network.

BACKGROUND OF THE INVENTION

Optical networks are usually organized in ring or meshed structures consisting of several nodes connected by unidirectional or, more often, bidirectional links. The usage of reconfigurable optical cross-connects introduces the possibility to reroute traffic and reallocate network resources in a dynamic way.

Modern optical transport networks for telecommunications rely upon coherent technology to convey information in the amplitude, phase and polarization of light. Whereas the first generation of optical coherent systems usually employed dual polarization QPSK (DP-QPSK) with hard-decision (HD) forward error correction (FEC), state-of-the-art systems support a variety of mQAM modulation formats and coding schemes, where m could e.g. be 16, 32, or 64. In particular, multi-rate multi-format transponders allow to choose coding and modulation according to the characteristics of the link at hand.

Transport networks are critical telecommunication infrastructures and are therefore subject to strict reliability constraints. An important requirement, often referred to as "survivability", is the ability of the network to provide the committed quality of service (QoS) in several failure scenarios, as regulated by the service level agreement (SLA) between network customers and provider. Although failure protection mechanisms can be realized in different layers of the protocol stack, in this disclosure particular focus is put on implementations at the physical layer.

Generally, whenever a link failure is detected, the traffic is rerouted onto an available backup link. In some cases a dedicated backup is assigned to some critical links, but typically a shared backup offers a better trade-off between reliability and costs. According to this approach, the network is provided with a certain amount of over-capacity, which is used in the case of failure to establish the required protection paths. At least for single failure scenarios on the most critical links, the protection paths are often preplanned to guarantee the shortest possible service interruption. Note that in the present disclosure, the terms "path" and "link" are used interchangeably.

In case of link failure, the preplanned or calculated protection link at the optical transport layer might possibly support only a fraction of the bit rate supported by the working link. This happens for instance when the protection path is impaired by stronger noise, nonlinear fiber effects, and/or filtering effects than the designated working path or "given link". This situation is not uncommon, especially when the backup is shared and hence cannot be finely optimized as the working path. However, depending on the SLA, a reduced throughput over the protection link in some fault scenarios is an acceptable option. In this case higher layers must take care of recovering the remaining traffic.

The flexible nature of multi-rate multi-format transponders offers a convenient way to down-grade the end-to-end throughput, by adapting the coding and modulation schemes. For instance, a 200 Gb/s signal transmitted over the working link using DP-16QAM could be downgraded to a 100 Gb/s signal using DP-QPSK to maintain satisfactory transmission quality over a longer protection link, by discarding the low-priority traffic. The adaptation of the transmission format could either be requested by a central control unit or could be negotiated autonomously between the involved transponders. Unfortunately, both approaches require, besides some signaling overhead, a full reconfiguration of the transponders at the end nodes of the link, which would typically include reprogramming registers of framer and modem devices, tuning analog oscillators and adjusting analog signal levels. This process is, however, extremely time-consuming and results in practice into severe service interruption which will often not be tolerable for high-priority traffic.

If the long reconfiguration time of the transponders and the additional signaling overhead shall be avoided, the problem could be circumvented, rather than solved, by constraining all protection paths to support at least the same throughput as their respective working path. However, this solution comes at a tremendous cost in terms of required overcapacity in the network. Further, this cost increases with the network size due to the growing number of possible failure scenarios that must be taken into account.

As an alternative, the throughput on the working path could be artificially lowered below the actual link capacity according to the transmission conditions of the worst-case protection path. Obviously, also this solution comes at a high price, because it sacrifices throughput during normal operation to guarantee a quick failure response.

SUMMARY OF THE INVENTION

The problem underlying the invention is to provide a method and apparatus for protecting a link in an optical network which allows for avoiding long interruption times but at the same time avoids high overcapacities in the network. This problem is solved by a method according to claim 1 as well as by a control device according to claim 13, a transmitter according to claim 16 and a receiver according to claim 17. Preferred embodiments are defined in the dependent claims.

According to the method of the invention, the link to be protected is configured for transmitting digital data employing a predetermined modulation format, wherein
said modulation format uses a constellation diagram comprising a number of symbols,
each symbol is represented by a point in an n-dimensional Euclidean signal space with $n \geq 1$,
a binary address is associated with each symbol, and
said modulation format allows for a constellation distortion, according to which the relative positions of constellation points in the constellation diagram are varied in a predetermined way by a predetermined degree.
The method further comprises the following steps:
A) partitioning the traffic to be transmitted over the link in two or more priority classes, B) mapping higher priority traffic to predefined bit positions within the binary symbol addresses, C) evaluating the quality of a predetermined protection link via which a part of the traffic could be transmitted in case of failure of the given link, D) determining a degree of distortion of the constellation diagram such that a desired transmission quality for the transmission of the traffic of the highest priority class or classes via said predetermined protection link and a desired transmission quality for the full traffic via said given link are simultaneously ensured, and E) employing a distorted constellation diagram with the determined degree of distortion for said transmission of digital data over said given link.

Herein, the n-dimensional Euclidean signal space could e. g. be a two-dimensional plane, such as an I-Q-signal plane. According to the invention, traffic to be transferred over the link is hence partitioned in at least two priority classes. Higher priority traffic is mapped to predefined bit positions within the binary symbol addresses. These would typically be bit positions which even in the modulation format without constellation distortion are better protected, or—in other words—have a lower error probability. Moreover, according to the invention the modulation format allows for a constellation distortion, according to which the relative positions of constellation points in the constellation diagram are varied in a predetermined way by a predetermined degree as compared to a default constellation, which is also referred to as "uniform constellation" herein. As will become more apparent with reference to specific examples, due to a suitable choice of distortion, it becomes possible to further increase the protection of the predefined bit positions to which the priority traffic is mapped.

According to the invention, it is ensured that at least the higher priority traffic will be safely transmitted in case the traffic is switched from the given link or "working link" to the protection link. Herein, the "higher priority traffic" is the traffic associated with the highest or, if there are more than two priority classes, possibly two or more highest priority classes. For this purpose, in step D) recited above, a degree of distortion of the constellation diagram is determined such that a desired transmission quality for the transmission of the traffic of the highest priority class or classes via said predetermined protection link is ensured. At the same time, the degree of distortion is chosen such that a desired transmission quality for the full traffic via the given link (working link) is simultaneously ensured.

If a degree of distortion that fulfills both requirements is found, then the corresponding distorted constellation diagram with the determined degree of distortion is used for the transmittal of digital data over the given link. In case of link value, the traffic can be switched to the protection link without a need for adapting the coding and modulation scheme and the reconfiguration time associated therewith, which allows for an extremely fast recovery of at least the high-priority traffic. If no such degree of distortion can be found, this would indicate that the quality of the protection link is insufficient, and that hence another protection link needs to be considered. However, the skilled person will appreciate that with the method of the invention, due to the possibility to adjust the distortion of the constellation diagram, the available links can be used much more efficiently than in the prior art described above, and that effectively the requirement to the quality of the links is considerably relaxed.

Note that some of the individual elements of the inventive method are known from prior art but in a different context. Assigning transmitted bits to different priority classes according to some importance criterion is e.g. described in R. Calderbank and N. Seshadri, "Multilevel codes for unequal error protection", *IEEE Transactions on Information Theory*, vol. 39, no. 4, pp. 1234-1248, July 1993. Further refinements were proposed by R. H. Morelos-Zaragoza, M. P. C. Fossorier, S. Lin and H. Imai in "Multilevel coded modulation for unequal error protection and multistage decoding—Part I: Symmetric constellations", *IEEE Transactions on Communications*, vol. 48, no. 2, pp. 204-213, February 2000 and by M. Isaka, M. P. C. Fossorier, R. H. Morelos-Zaragoza, S. Lin and H. Imai in "Multilevel coded modulation for unequal error protection and multistage decoding—Part II: Asymmetric constellations", *IEEE Transactions on Communications*, vol. 48, no. 5, pp. 774-786, May 2000, where also the possibility of distorting constellation diagrams is mentioned. More recent developments are described by C. Shen, and M. Fitz in "On the Design of Modern Multi-level Coded Modulation for Unequal Error Protection Communications," available in the proceedings of the *IEEE International Conference on Communications ICC '08* on pp. 1355-1359 and by N. von Deetzen, and W. Henkel in "Unequal error protection multilevel codes and hierarchical modulation for multimedia transmission" included in the proceedings of the *IEEE International Symposium on Information Theory ISIT* 2008 on pp. 2237-2241. However, none of these documents consider the possibility of these generic techniques in the context of network survivability, or employing any of steps C) to E) above.

In a preferred embodiment, the method further comprises, in case of failure of said given link, a step F) of rerouting the traffic to said protection path.

In a preferred embodiment, in step C), the quality of a plurality of alternative predetermined protection links are evaluated, and in step D), the degree of distortion of the constellation diagram is determined such that a desired transmission quality for the worst of said plurality of alternative predetermined protection links is ensured. This way, in case of failure of the working link, it is possible to switch to any one of the alternative predetermined protection links, upon their availability, while still ensuring that at least the high-priority traffic will be safely transmitted. Accordingly, the number of predetermined protection links can be shared with further working links, which allows for a more efficient use of network capabilities.

In the constellation distortion referred to above, the predetermined way of varying the relative positions of constellation points preferably comprises one or more of varying the distances of a subset of adjacent constellation points in said constellation diagram, varying the distances of a subset of constellation points from a predefined position in the signal space which does not coincide with a constellation point, or rotating the position of a subset of constellation points with respect to an origin of said signal space.

As will become more apparent from the description below, these types of constellation distortions do in fact allow for further decreasing the error probability of the bit positions to which the higher priority traffic is mapped. Herein, the "predefined position in the signal space" may correspond to the center of mass of a subset of constellation points, or may be chosen such that upon the variation, the average power of the signal remains unchanged, bearing in mind that the power associated with a symbol is proportional to the square of the symbol distance from the origin of the n-dimensional signal space. The "center of mass" of a number of constellation points shall refer to an average position defined by the average of their respective coordinates.

In a preferred embodiment, the constellation diagram is two-dimensional and comprises four quadrants, and in said binary addresses of said constellation points, there are two predetermined bit positions which have identical values for each constellation point within the same quadrant. Herein, higher priority traffic is mapped to said predetermined two bit positions. This embodiment exploits the fact that even in case of a poor link quality, such as due to higher noise, it will more likely be possible to distinguish symbols from each other that are located in different quadrants and hence comparatively far spaced apart. On the other hand, if symbols within the same quadrant are confused with each other due to a poor signal quality, this does not affect the two bits at the bit positions related to the quadrant, which would hence still be correct. In other words, the error probability for these bits is comparatively low.

In a preferred embodiment, the modulation format employs a 16QAM constellation, and in said constellation distortion, the predetermined way of varying the relative positions of constellation points comprises reducing the distances between constellation points within the same quadrant while increasing the minimum distance between constellation points of different quadrants, as compared to an even distribution of constellation points. This way, the error probability of bit positions related to the quadrants is further decreased, although at the expense of an increased error probability associated with symbols within a quadrant.

In another preferred embodiment, the modulation format employs a 32QAM constellation, and in said constellation distortion, the predetermined way of varying the relative positions of constellation points comprises
- for the four constellation points in each quadrant that are closest to the origin of the two-dimensional plane, reducing their respective distance from their center of mass, and
- for the four constellation points in each quadrant that are the farthest from the origin of the two-dimensional plane, increasing their respective distance from the closest one among the four constellation points closest to the origin, as compared to an even distribution of constellation points. This way, again two bit positions corresponding to the quadrant can be strengthened, and in addition, a further bit position can be strengthened, at the expense of the remaining two bit positions, as will become more apparent from an example of a specific embodiment below.

In another preferred embodiment, the modulation format employs an 8QAM constellation, and in said constellation distortion, the predetermined way of varying the relative positions of constellation points comprises rotating the four constellation points farthest away from the origin around said origin by an angle, said angle defining said degree of variation. In this embodiment, the error probability of the two bit positions can be decreased at the expense of the error probability of the remaining bit position, as will become more apparent from an example of a specific embodiment below.

In various embodiments, the traffic to be transmitted over the link corresponds to one of the following:
- 200 G traffic transmitted over a single DP-16QAM optical carrier partitioned in two 100 G signals with different priorities,
- 300 G traffic transmitted over a super channel consisting of two DP-8QAM carriers, or
- a single carrier 400 G transmission using 32QAM or 64QAM.

In a preferred embodiment, the method further comprises mapping individual FlexEthernet streams to different bit sets in the binary address of the constellation symbols.

According to a further aspect of the invention, a control device for controlling the protection of a link in an optical network is provided. Such a control device could e.g. be a network management tool employing suitable software provided for being executed on one or more computers. However, the control device is not limited to any specific type of hardware element, as long as it is capable of carrying out the functions recited below. The control device is configured to be operatively connected to a transmitter and a receiver associated with said link, said transmitter being configured for transmitting digital data employing a predetermined modulation format of the type recited above with reference to the method of the invention. The associated transmitter is further configured for partitioning the data to be transmitted over the link in two or more priority classes, and mapping higher priority traffic to predefined bit positions within the binary symbol addresses.

The control device is further configured for evaluating the quality of a predetermined protection link via which a part of the traffic could be transmitted in case of failure of the given link, determining a degree of distortion of the constellation diagram such that a desired transmission quality for the transmission of the traffic of the highest priority class or classes via said predetermined protection link and a desired transmission quality for the full traffic via said given link are simultaneously ensured, and instructing said transmitter and said receiver to employ a distorted constellation diagram with the determined degree of distortion for said transmission of digital data over said given link.

SHORT DESCRIPTION OF THE FIGURES

Figure 2:
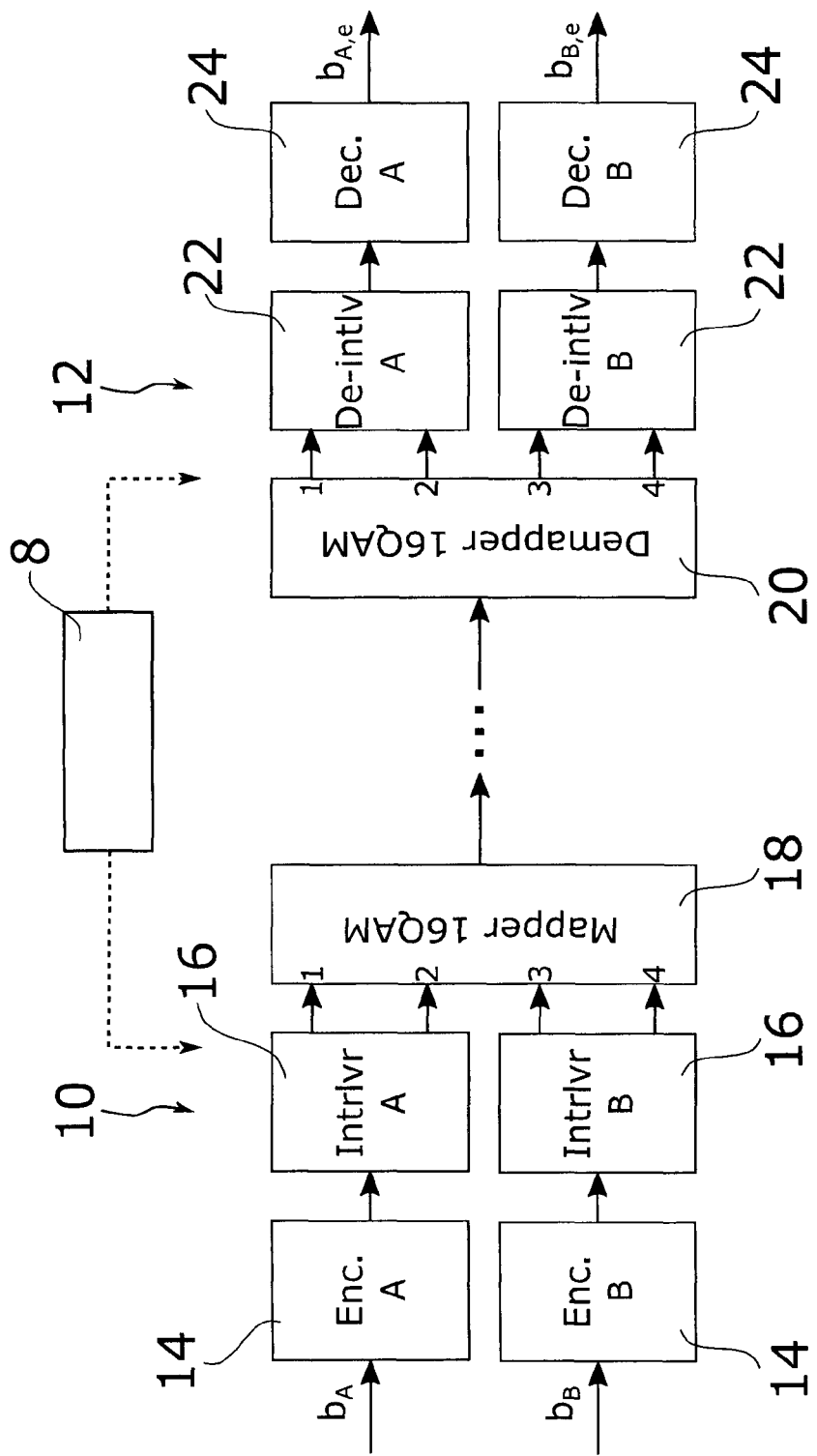
Figure 3:
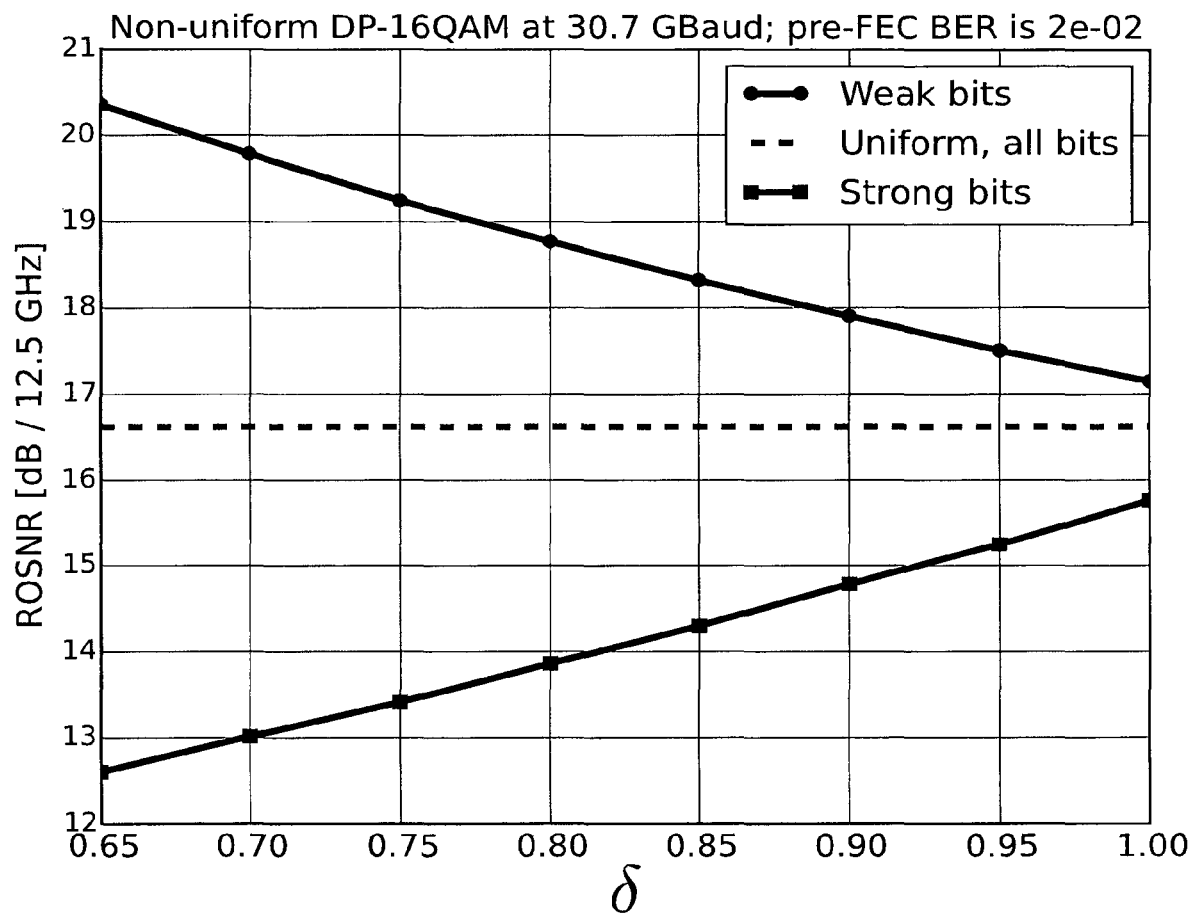
Figure 4:
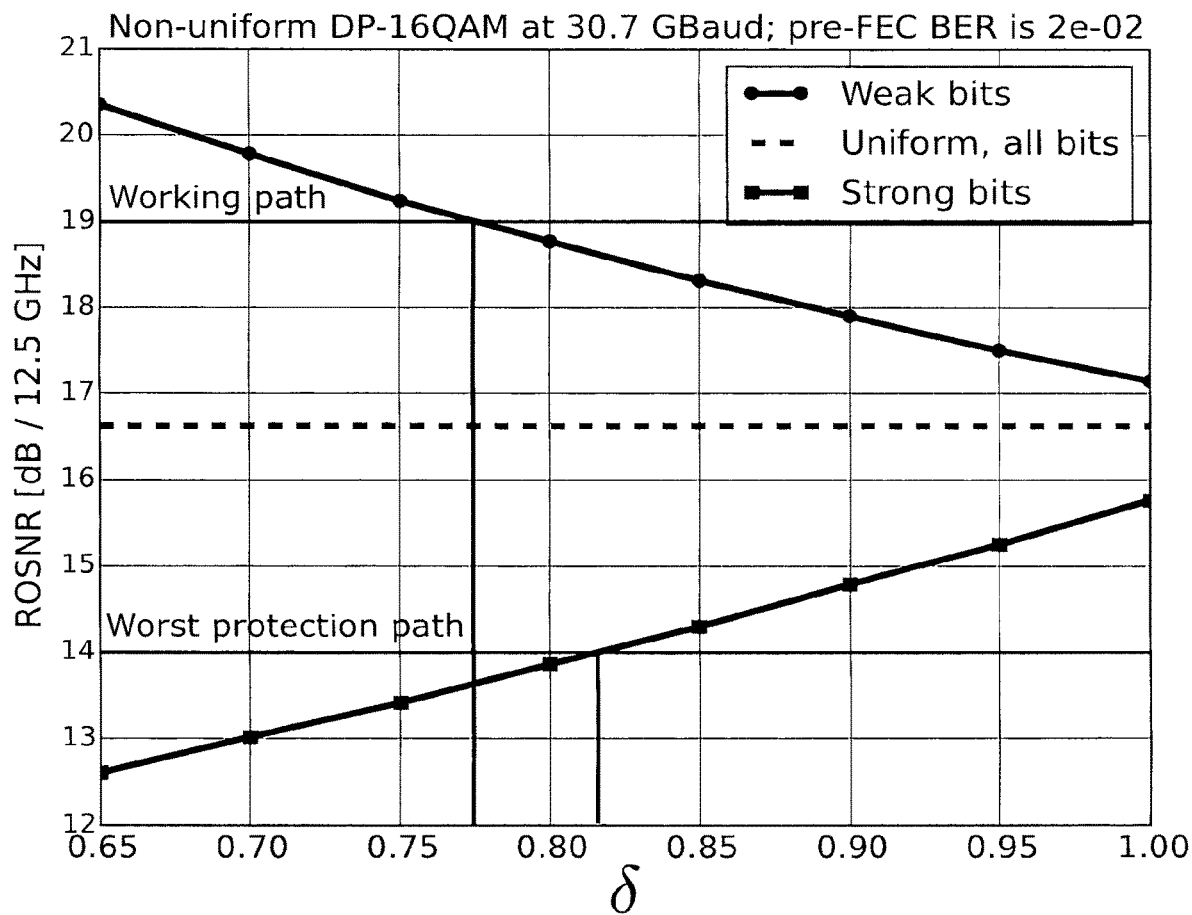
Figure 5:
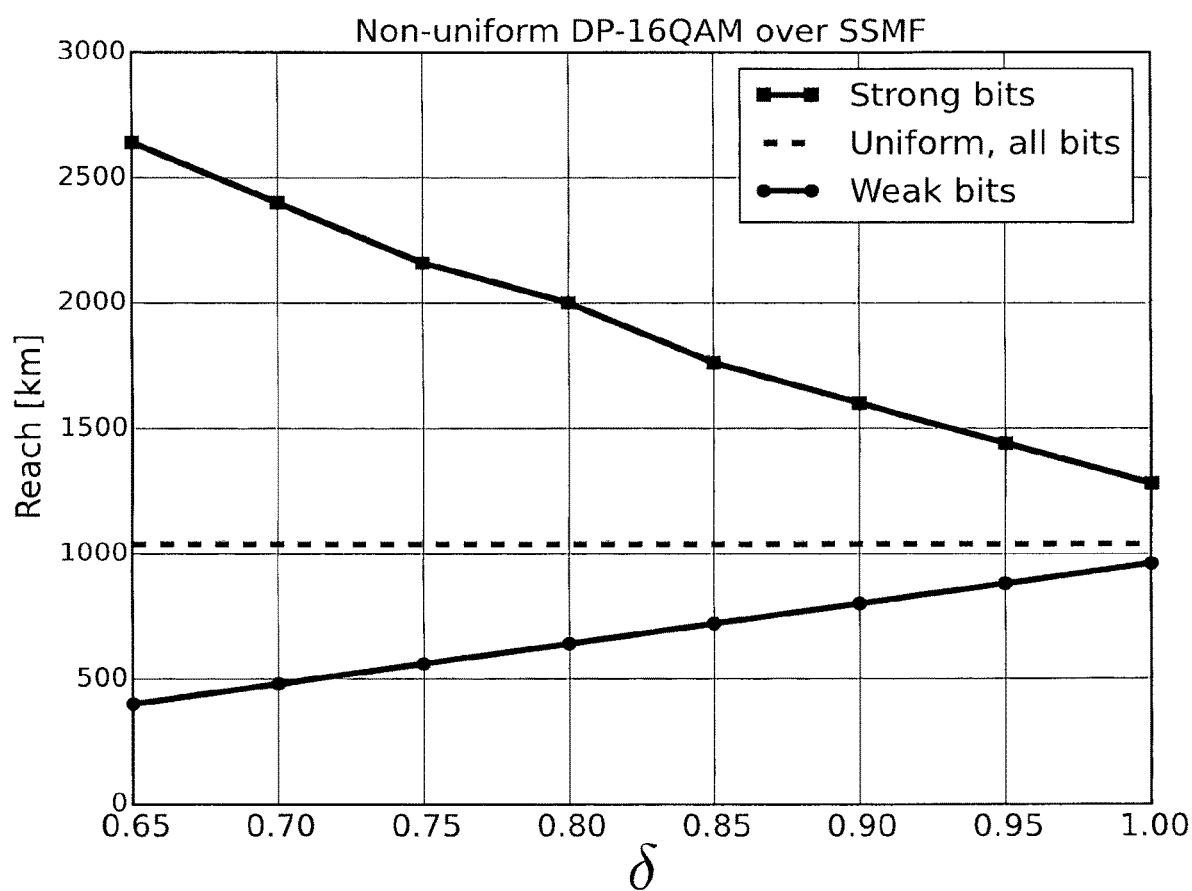
Figure 6:
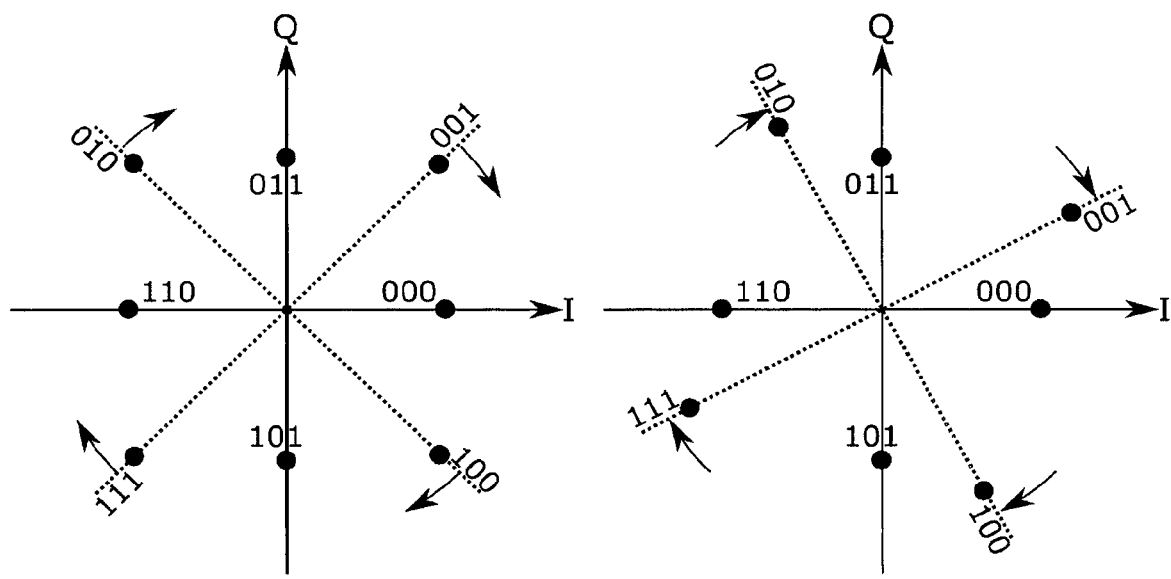
Figure 7:
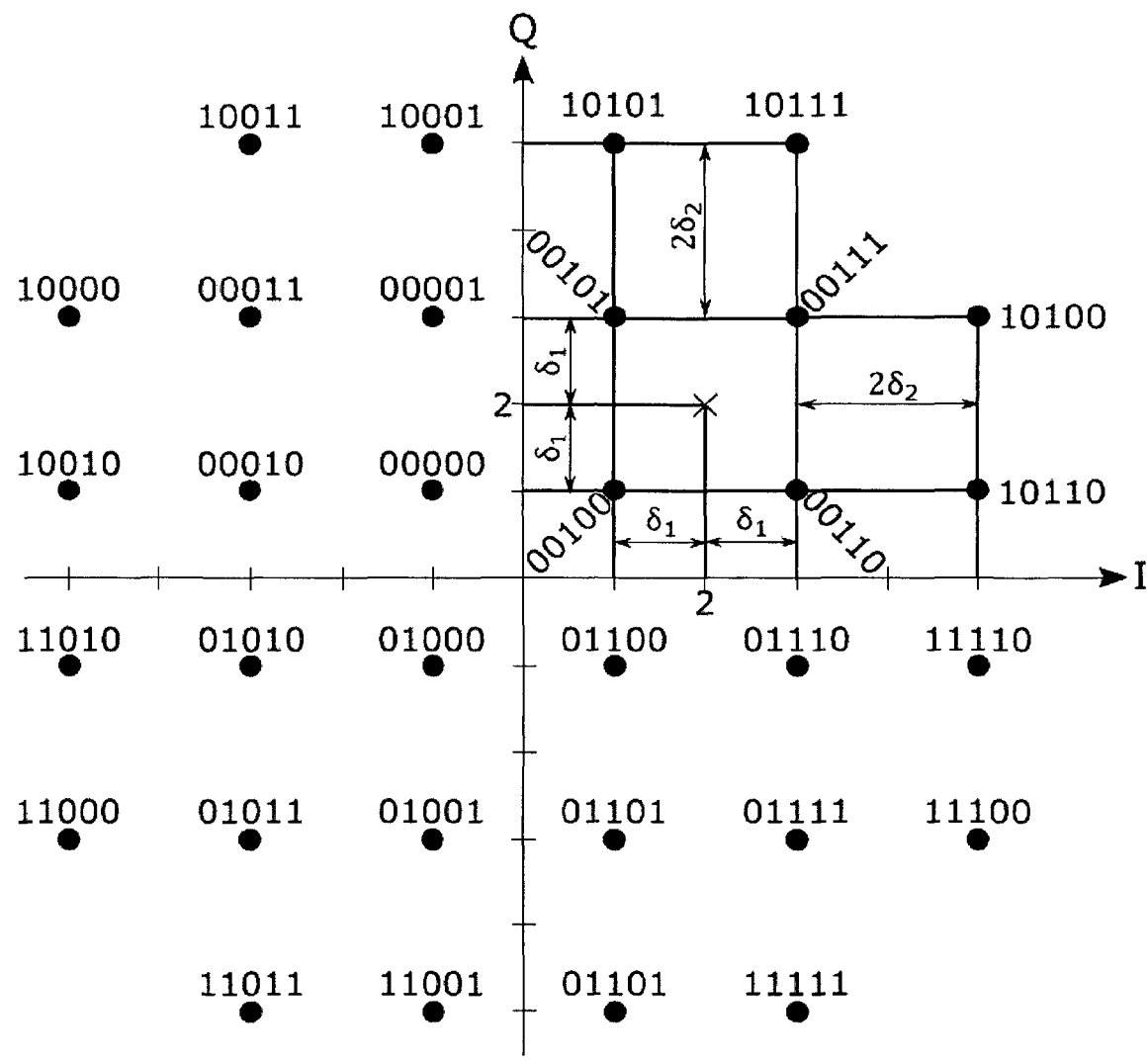

FIG. 1 shows a Gray labeled 16QAM constellation diagram without distortion on the left and with distortion on the right, FIG. 2 shows a transmitter and a receiver for use in the method of the invention, FIG. 3 shows the required OSNR at a pre-FEC BER of $2.10^{-2}$ for non-uniform DP-16QAM with a symbol rate of 30.7 GHz, FIG. 4 is a diagram illustrating the derivation of a required degree of distortion of a constellation diagram, FIG. 5 is a diagram showing the reach of the strong bits and the week bits as a function of the degree of distortion of the constellation diagram, FIG. 6 shows a Gray labeled 8QAM constellation diagram without distortion on the left and with distortion on the right, FIG. 7 shows a quasi-Gray labeled 32QAM constellation diagram distorted according to two independent distortion parameters.

DESCRIPTION OF THE PREFERRED EMBODIMENTS

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

For the sake of exemplification we give a detailed description of the method of the invention for the important case that the given link or "working path" carries a payload of about 200 Gb/s, shortly referred to as a "200G client", over a single optical carrier. The modulation format of choice for this application is considered to be DP-16QAM.

The left side of FIG. 1 shows a uniform 16QAM two-dimensional constellation diagram with Gray labeling: The binary addresses of any two symbols at minimum Euclidean distance differ exactly in one position. In this shown example, the two rightmost bits identify the quadrant, whereas the two leftmost bits determine the symbol in the quadrant on the in-phase (I)-quadrature (Q) plane. With the adopted normalization, the average of the four constellation points in the first quadrant, referred to as "a center of mass" herein and marked by a cross, lies at (2, 2). In each quadrant the distance δ between the projection of every symbol and the projection of the center is equal to 1 both on the I and Q axes. The situation is referred to as the "uniform" or "non-distorted" constellation.

The right side of FIG. 1 shows a non-uniform, "distorted" 16QAM constellation where δ has been decreased to 0.75. Herein, δ is a geometrical parameter that indicates the "degree of distortion" referred to above, and is also referred to as "distortion parameter" herein. In this case the distance between symbols belonging to different quadrants is enhanced at the expense of the intra-quadrant distances. A reduction of δ hence increases the error resilience on the two rightmost bit positions and degrades that of the two leftmost bit positions in the binary address. Since the two rightmost bits are better protected, they are also referred to as "strong bits" herein, and the two leftmost bits will be referred to as "weak bits". Note that this distortion of the constellation is an example of the "varying of the distances of a subset of constellation points from a predefined position in the signal space which does not coincide with a constellation point" referred to in the introductory portion of the specification, where the predefined position corresponds to the center of mass of the four constellation points in each quadrant. The position of the center of mass could be further shifted such as to keep the average power of the corresponding signal constant.

In the described example, it shall be assumed that the 200 G signal is partitioned in a high-priority and a low-priority 100 G client according to step A) referred to above.

In the following step B), the high-priority traffic is mapped to the strong bits and the low-priority traffic is mapped to the weak bits. This is illustrated in FIG. 2, in which a transmitter 10 and a receiver 12 are shown. As further shown in FIG. 2, the transmitter 10 comprises two identical encoders A and B at reference sign 14, two interleavers A and B at reference sign 16 and a mapper 18. The receiver 12 comprises a demapper 20, de-interleavers A and B at reference sign 22 and decoders A and B at reference sign 24.

The high-priority and low-priority bit streams, $b_A$ and $b_B$ respectively, are separately encoded by the two identical encoders A and B shown at reference sign 14. Each encoded stream is distributed by the corresponding interleaver 16 between two different inputs of the mapper, corresponding to different bit positions in the binary address. With reference to FIG. 1, the binary positions are numbered from right to left from 1 to 4. The receiver 12 implements the corresponding sequence of inverse operations.

Further shown in FIG. 2 is a control device 8 which is operatively coupled with the transmitter 10 and the receiver 12. The control device 8 can be realized in software, in hardware or both. In particular, the control device 8 is capable for carrying out the above-mentioned method steps C) and D), and to communicate to the transmitter 10 and the receiver 12 the degree of distortion of the constellation that shall be employed.

FIG. 3 shows simulation results for DP-16QAM over a DP additive white Gaussian noise (AWGN) channel. A symbol rate of 30.7 GHz is chosen to transport the whole 200 G traffic and accommodate for 15% FEC overhead and for pilot symbols employed for non-differential transmission. The required optical signal-to-noise ratio (ROSNR), defined over a noise bandwidth of 12.5 GHz, for a pre-FEC bit error rate (BER) of $2 \cdot 10^{-2}$, which is assumed to be the FEC threshold, is plotted as a function of the geometry parameter or "distortion parameter" δ both for the strong and the weak bits. The dotted line shows also the ROSNR for a conventional approach with uniform 16QAM when a single FEC code is applied through bit-interleaving to all four bit positions. In FIG. 3, it is seen that by reducing δ, or in other words increasing the degree of distortion, the resilience of the strong bits is increased while sacrificing the performance of the weak bits.

Next, according to step C) referred to above, the quality of a predetermined protection link via which a part of the traffic could be transmitted in case of failure of the given link or working path is determined. In particular, this comprises determining the available optical signal-to-noise ratio (OSNR) on the working path and the worst-case protection path. Herein, the "worst-case protection path" is the protection path among a set of predetermined alternative protection paths providing the worst transmission quality. For the sake of exemplification it shall be assumed that that these values are 19 dB and 14 dB, respectively, as shown by the additional horizontal lines in FIG. 4.

Proceeding with step D), the geometry parameter δ, or in other words, the degree of distortion, is determined such as to ensure that the pre-FEC BER is equal or better than the desired threshold both on the working path and the worst protection path. As indicated by the additional vertical lines in FIG. 4, allowed values of the geometry parameter δ range roughly from 0.775 to 0.817. According to step E) the distorted constellation diagram with the determined degree of distortion, i.e. with 0.775<δ<0.817, is then employed for the transmission of digital data over the working path. In case of link failure, the traffic is rerouted according to step F) without changing the modulation format, and maintaining the geometry parameter or "degree of distortion" δ. Having chosen the geometry parameter δ in the allowable range, it is ensured that the receiver is still capable of detecting the high-priority traffic with the desired performance without reconfiguration of the coding and modulation scheme.

Although the proposed solution was exemplified over an idealized AWGN channel model, it works without fundamental modifications also under realistic channel conditions. FIG. 5 shows the performance of non-uniform DP-16QAM over a nonlinear fiber-optic link consisting of several 80 km spans of standard single-mode fiber (SSMF) connected through erbium-doped fiber amplifiers (EDFAs). Again a non-differential transmission and 15% overhead FEC with a BER threshold of $2 \cdot 10^{-2}$ are assumed. The performance of 96 wavelength division multiplexed carriers with 50 GHz spacing is evaluated, assuming a system margin of 3 dB, an implementation penalty of 2 dB and an EDFA noise figure of 5 dB. The nonlinear interference caused by the fiber is evaluated according to the semi-analytical GN-model described by A. Carena, V. Curri, G. Bosco, P. Poggiolini, and F. Forghieri in the article "Modeling of the impact of non-linear propagation effects in uncompensated optical coherent transmission links", *IEEE Journal of Lightwave Technology*, volume 30, number 10, pp. 1524-1539 (2012). A launch power of ~3 dBm per channel is assumed, which corresponds to optimum performance.

FIG. 5 shows the maximum reach both for the strong and the weak bits as a function of the geometry parameter δ. Additionally, the dotted line indicates the reach of a conventional transmission system with uniform 16QAM and a single FEC code applied to all four bit positions. It is apparent that the nonlinear fiber effects do not alter the qualitative trend observed in FIG. 3. Once again, by tuning δ one can optimize the performance of strong and weak bits according to the characteristics of protection and working paths.

Note that after step F), some parameters of the receiver may still need resynchronization or adaptation. In particular the accumulated chromatic dispersion (CD) and the polarization mode dispersion (PMD) over the protection link are typically different from the working link. The resynchronization of the CD compensator (not shown) at the receiver 12 could be either triggered externally together with the reconfiguration of the cross-connects (not shown) or initiated automatically by a locally generated alarm. The PMD compensator is continuously adapted at run-time and therefore reacts automatically to the new channel conditions. The benefit of the approach of the invention stems from the fact that with the current transponder technology, the adaptation of the receiver parameters is much faster (roughly by two orders of magnitude) than a reconfiguration of the coding and modulation scheme.

According to the invention, in case of link failure, the high-priority client experiences only a short interruption due to failure detection time, reconfiguration of the cross-connects and resynchronization of the receiver: its protection mechanism is completely implemented in the optical layer. On the contrary, the low-priority traffic is dropped at the optical link layer and its protection is fully delegated to the higher layers. As a consequence, low-priority traffic is likely to undergo a longer downtime, consistent with the state of the art.

In the previous example, the 200G traffic transmitted over a single DP-16QAM optical carrier was partitioned in two 100G signals with different priorities. This application addresses in a natural way the problem of transporting two optical data units 4 (ODU4), which are standard 100 G client signals defined in the optical transport network (OTN) multiplexing hierarchy introduced in the ITU-T recommendation G.709/Y.1331 (February 2012).

Other advantageous embodiments of the invention relate to
- the transport of 300 G traffic over a super-channel consisting of two DP-8QAM carriers,
- single carrier 400 G transmission using 32QAM, or
- 400 G transmission over a single 64QAM carrier.

In all these cases, by distorting the symbol constellation, the protection level of distinct ODU4 (100 G) clients can be altered. However, various embodiments of the invention allow also a different granularity of the traffic classes when the transport equipment implements traffic aggregation. This becomes particularly attractive in conjunction with the FlexEthernet project started by the Optical Internetworking Forum (OIF) with the aim of introducing flexible rate connections between routers. Using FlexEthernet-aware transport equipment, in one embodiment one can map individual FlexEthernet streams to different bit-sets in the binary address of the constellation symbols. For example, one can partition 250 G traffic transported over a single DP-16QAM carrier into two 125 G FlexEthernet clients with different priorities or 150G traffic transported over a single DP-8QAM carrier into a 100 G and a 50G client. Further examples are easily conceivable in view of the present disclosure.

While in the embodiment above, only DP-16QAM modulation formats have been discussed in detail, the invention is by no means limited to this. Square mQAM constellations, like 64QAM, can be treated similarly to 16QAM by clustering their symbols around their center of mass in each quadrant. If necessary, each group of four neighboring points can be further clustered around their respective center of mass, and the center of mass may optionally be shifted.

According to a further embodiment, the left side of FIG. 6 shows a uniform 8QAM constellation with quasi-Gray labeling. By rotating the outer constellation points in clockwise direction, the constellation on the right side of FIG. 6 is obtained, where the two leftmost bits are strengthened at the expense of the rightmost bit.

According to a further embodiment, FIG. 7 shows a quasi-Gray labeled 32QAM constellation together with two possible distortion parameters $\delta_1$ and $\delta_2$ that control its geometry. With the adopted normalization, for $\delta_1=\delta_2=1$ the uniform constellation is obtained. By decreasing $\delta_1$, for the four constellation points in each quadrant that are closest to the origin of the two-dimensional plane, the respective distance from their center of mass is reduced, which strengthens the quadrant bits 3 and 4 (numbering from right to left) at the expense of the rightmost bits 1 and 2. By increasing $\delta_2$, for the four constellation points in each quadrant that are the farthest from the origin of the two-dimensional plane, the respective distance from the closest one among the four constellation points closest to the origin is increased, which protects the leftmost bit 5 at the expense of all other bits.

Alternative geometry parameters for the constellations mentioned above and for further symbol constellations can be determined the framework of alternative embodiments. Although a preferred exemplary embodiment is shown and specified in detail in the drawings and the preceding specification, these should be viewed as purely exemplary and not as limiting the invention. It is noted in this regard that only the preferred exemplary embodiment is shown and specified, and all variations and modifications should be protected that presently or in the future lie within the scope of protection of the invention as defined in the claims.

The invention claimed is:

1. A method for protecting a given link in an optical network, a signal being modulated based on a predetermined modulation format to carry traffic including digital data, wherein
the modulation format is based on a constellation including a plurality of points in an n-dimensional Euclidean signal space with $n\geq 1$, each of the plurality of points representing a respective one of a plurality of symbols,
each of the plurality of points has a relative position within the constellation,
each of the plurality of symbols has a respective one of a plurality of binary addresses, and
the predetermined modulation format allows for a constellation distortion, wherein relative positions of the plurality of the points in the constellation are varied in a predetermined manner by a predetermined degree, the method comprising the steps of:

A) partitioning a first part of the traffic, the first part of the traffic having a higher priority than a second part of the traffic, B) mapping the first part of the traffic to predefined bit positions of selected binary addresses within the plurality of binary addresses, C) evaluating a quality of a predetermined protection link over which a portion of the traffic could be transmitted in case of a failure of the given link, D) determining a degree of distortion of the constellation wherein a desired transmission quality for transmission over the predetermined protection link of the first part of the traffic, and a desired transmission quality for transmission over the given link of the traffic to be transmitted over the given link, are simultaneously ensured, and E) employing a distorted constellation with the determined degree of distortion for transmission of the digital data over the given link.

2. The method of claim 1, wherein the predefined bit positions are bit positions associated with the at least one of the plurality of points of the constellation that have an error probability less than an average error probability of the bit positions of all the plurality of points of the constellation.

3. The method according to claim 1, further comprising a step F) that includes rerouting the traffic to the predetermined protection link in case of a failure of the given link.

4. The method according to claim 1, wherein in step C), the predetermined protection link is one of a plurality of alternative predetermined protection links that are evaluated for transmission quality, and wherein in step D), the degree of distortion of the constellation is determined such that the desired transmission quality is provided for one of the plurality of alternative predetermined protection links determined by step C) to have the worst transmission quality of the plurality of alternative predetermined protection links.

5. The method according to claim 1, wherein in the constellation distortion, the predetermined way of varying the relative positions of the at least a plurality of the constellation points comprises one or more of varying distances of a subset of adjacent ones of the constellation points in the constellation diagram, varying distances of a subset of the constellation points from a predefined position in the signal space which does not coincide with a constellation point, rotating a position of a subset of the constellation points with respect to an origin of the signal space.

6. The method according to claim 5, wherein the predefined position in the signal space corresponds to a center of mass of a subset of the constellation points, or is chosen such that upon the variation of the relative positions of the at least a plurality of the constellation points, an average power of a signal comprising the at least a plurality of the constellation points remains unchanged.

7. The method according to claim 1, wherein the constellation is in a two-dimensional plane, which comprises four quadrants, wherein in the binary addresses of the points, there are two predetermined bit positions which have identical values for each of a group of the plurality of points associated with the same quadrant, and wherein the first part of the traffic is mapped to the predetermined two bit positions.

8. The method according to claim 7, wherein the modulation format is based on a 16QAM constellation, and wherein in the constellation distortion, the predetermined manner of varying the relative positions of the at least a plurality of the constellation points comprises reducing distances between each of a group of the plurality of points within a same quadrant, while increasing a minimum distance between a first point within the group of the plurality of points and a second point of the group of plurality of points in a second quadrant, as compared to an even distribution of the plurality of points.

9. The method according to claim 7, wherein the modulation format is based on a 32QAM constellation, and wherein in the constellation distortion, the predetermined manner of varying the relative positions of the constellation points comprises:

for each of a first four of the plurality of points, which are in one of the quadrants and are closest to an origin of the two-dimensional plane, reducing a respective distance between one of the plurality of points and a center of mass of the four points that are closest to the origin; and for each of a second four of the plurality of points, which are in the one of the quadrants and are farthest from the origin of the two-dimensional plane, increasing a respective distance between the one of the plurality of points and a closest one among the first four points that are closest to the origin.

10. The method according to claim 7, wherein the modulation format employs an 8QAM constellation, and wherein in the constellation distortion, the predetermined manner of varying the relative positions of the group of the plurality of points comprises rotating, by an angle about an origin of the two-dimensional plane, each of four constellation points farthest away from the origin, the angle defining a degree of variation.

11. The method of claim 1, wherein the traffic to be transmitted comprises at least one of the following:

200 G traffic to be transmitted using a single DP-16QAM optical carrier partitioned into two 100 G signals, wherein one of the two 100 G signals is for traffic belonging to the first part of the traffic, 300 G traffic to be transmitted using a super channel comprising two DP-8QAM carriers, single-carrier 400 G traffic to be transmitted using 32QAM or 64QAM.

12. The method of claim 1, wherein the method further comprises mapping a first FlexEthernet stream to a bit set in one of the plurality of binary addresses of one of the plurality of symbols that is a different bit set to which a second FlexEthernet stream is mapped in the one of the plurality of binary addresses of the symbol.

13. A control device for controlling the protection of a given link in an optical network over which a transmitter is operative to transmit to a receiver a signal being modulated based on a predetermined modulation format to carry traffic including digital data, wherein the modulation format is based on a constellation including a plurality of points in an n-dimensional Euclidean signal space with n>1, each of the plurality of points representing a respective one of a plurality of symbols, each of the plurality of points has a relative position within the constellation, each of the plurality of symbols has a respective one of a plurality of binary addresses, and the predetermined modulation format allows for a constellation distortion wherein relative positions of the plurality of the points in the constellation are varied in a predetermined manner by a predetermined degree, the transmitter further operative to partition a first part of the traffic, the first part of the traffic having a higher priority than a second part of the traffic, and map the first part of the traffic to predefined bit positions of selected binary addresses within the plurality of binary addresses, the control device comprising hardware or a combination of hardware and software, wherein the control device is operative to evaluate a quality of a predetermined protection link over which a portion of the traffic could be transmitted in case of a failure of the given link, determine a degree of distortion of the constellation wherein a desired transmission quality for transmission over the predetermined protection link of the first part of the traffic, and a desired transmission quality for transmission over the given link of the traffic the transmitter is operative to transmit over the given link, are simultaneously ensured, and control the transmitter and the receiver to employ a distorted constellation diagram with the determined degree of distortion for transmission of the digital data over the given link.

14. The control device of claim 13, wherein the control device is operatively connected to each of the transmitter and the receiver.

15. The control device of claim 13, wherein the constellation diagram is two-dimensional and comprises four quadrants, in the binary addresses of the constellation points there are two predetermined bit positions which have identical values for each constellation point within the same quadrant, and traffic partitioned into the class of higher priority is mapped to the predetermined two bit positions.

16. A system for transmitting, over a given link, a signal being modulated based on a predetermined modulation format to carry traffic including digital data, wherein the modulation format is based on a constellation including a plurality of points in an n-dimensional Euclidean signal space with n>1, each of the plurality of points representing a respective one of a plurality of symbols, each of the plurality of points has a relative position within the constellation, each of the plurality of symbols has a respective one of a plurality of binary addresses, and the predetermined modulation format allows for a constellation distortion wherein relative positions of the plurality of the points in the constellation are varied in a predetermined by a predetermined degree, the system comprising a transmitter and a control device, wherein the transmitter is operative to partition a first part of the traffic, the first part of the traffic having a higher priority than a second part of the traffic, map the first part of the traffic to predefined bit positions of selected binary addresses within the plurality of binary addresses, receive instructions from the control device to employ the distorted constellation diagram with a determined degree of distortion for transmission of the digital data, and employ a distorted constellation diagram with the determined degree of distortion for transmission of the digital data, wherein the control device is operative to evaluate a quality of a predetermined protection link over which a portion of the traffic could be transmitted in case of a failure of the given link, determine the degree of distortion of the constellation wherein a desired transmission quality is simultaneously ensured for transmission of the traffic over the given link, and transmission over the predetermined protection link of the first part of the traffic partitioned, and control the transmitter to employ a distorted constellation diagram with the determined degree of distortion for transmission of digital data over the given link.

17. A system for receiving, from a given link, a signal being modulated based on a predetermined modulation format to carry traffic including digital data, wherein the modulation format is based on a constellation including a plurality of points in an n-dimensional Euclidean signal space with n>1, each of the plurality of points representing a respective one of a plurality of symbols, each of the plurality of points has a relative position within the constellation, each of the plurality of symbols has a respective one of a plurality of binary addresses, and the predetermined modulation format allows for a constellation distortion wherein relative positions of the plurality of the points in the constellation are varied in a predetermined by a predetermined degree, the system comprising a receiver and a control device, wherein the receiver is operative to receive instructions from the control device to employ the distorted constellation diagram with a determined degree of distortion for receiving digital data, and employing a distorted constellation diagram with the determined degree of distortion for receiving digital data, wherein the control device is operative to evaluate a quality of a predetermined protection link over which a portion of the traffic could be transmitted in case of a failure of the given link, determine the degree of distortion of the constellation wherein a desired transmission quality is simultaneously ensured for transmission of the traffic over the given link, and transmission over the predetermined protection link of the first part of the traffic partitioned, and control the receiver to employ a distorted constellation diagram with the determined degree of distortion for transmission of digital data over the given link.

18. The system of claim 16, wherein the predefined bit positions are bit positions associated with the at least one of the plurality of points of the constellation that have an error probability less than an average error probability of the bit positions of all the plurality of points of the constellation.

19. The system of claim 16, wherein in case of failure of the given link, the system reroutes the traffic to the predetermined protection link.

20. The system of claim 16, wherein the predetermined protection link is one of a plurality of alternative predetermined protection links the control device is operative to evaluate for transmission quality, and wherein the degree of distortion of the constellation diagram is determined such that the desired transmission quality is provided for a one of the plurality of predetermined protection links determined by the evaluation to have the worst transmission quality of the plurality of alternative predetermined protection links.

* * * * *